(12) United States Patent
Lin

(10) Patent No.: US 11,105,493 B2
(45) Date of Patent: Aug. 31, 2021

(54) INTEGRATED LAMP STAND

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 0 days.

(21) Appl. No.: 17/105,549

(22) Filed: Nov. 26, 2020

(65) Prior Publication Data
US 2021/0156549 A1   May 27, 2021

(30) Foreign Application Priority Data
Nov. 27, 2019 (CN) .......................... 201922080016.9

(51) Int. Cl.
| | |
|---|---|
| *F21V 21/00* | (2006.01) |
| *F21V 21/06* | (2006.01) |
| *F21V 1/06* | (2006.01) |
| *F21V 1/16* | (2018.01) |
| *F21V 21/22* | (2006.01) |
| *F21V 21/30* | (2006.01) |
| *F21V 33/00* | (2006.01) |

(52) U.S. Cl.
CPC .............. *F21V 21/06* (2013.01); *F21V 1/06* (2013.01); *F21V 1/16* (2013.01); *F21V 21/22* (2013.01); *F21V 21/30* (2013.01); *F21V 33/0056* (2013.01)

(58) Field of Classification Search
CPC .......... F21V 21/06; F21V 21/22; F21V 21/30; F21V 1/06; F21V 1/16; F21V 33/0056; F21V 21/14; G03B 15/0426; G03B 15/02; G03B 15/06
See application file for complete search history.

(56) References Cited

U.S. PATENT DOCUMENTS

| | | | |
|---|---|---|---|
| 2004/0228133 A1* | 11/2004 | Tsao ........................ | F21V 21/06 362/418 |
| 2010/0182777 A1* | 7/2010 | Van Deursen .......... | F21V 21/06 362/190 |
| 2010/0277899 A1* | 11/2010 | Peak ....................... | F21V 21/06 362/191 |
| 2018/0119920 A1* | 5/2018 | Lin .......................... | F21V 1/06 |

* cited by examiner

*Primary Examiner* — Y M. Quach Lee
(74) *Attorney, Agent, or Firm* — Lin & Associates IP, Inc.

(57) ABSTRACT

Disclosed is an integrated lamp stand, including: a support stand having three leg tubes, a center tube assembly, and a sliding connector slidably sleeved on the center tube assembly; a pivot member coupled on a top of the center tube assembly; and a lamp body pivotably connected to the pivot member. In an expanded state, the leg tubes are expanded, the sliding connector is moved to a predetermined position of the center tube assembly, the center tube assembly is elongated, and the lamp body is adjusted to a predetermined angle. In a collapsed state, the leg tubes are collapsed, the sliding connector is moved to another predetermined position of the center tube assembly, the center tube assembly is adjusted to a minimum length, and the lamp body is adjusted to another predetermined angle, whereby the lamp body and the support stand are collapsed to a slender shape.

9 Claims, 14 Drawing Sheets

INTEGRATED LAMP STAND

CROSS-REFERENCE TO RELATED APPLICATION

This application claims the priority of Chinese patent application No. 201922080016.9, filed on Nov. 27, 2019, which is incorporated herewith by reference.

BACKGROUND OF THE INVENTION

1. Field of the Invention

The present invention relates to a lamp stand, and more particularly, to an integrated lamp stand in which the photography lamp body and the support stand can be collapsed to a slender shape.

2. The Prior Arts

For the conventional photography lamp stand, when in use, the lamp body and the support stand must be assembled together. When in storage, the volume thereof is often so large that it is inconvenient to carry. Therefore, the lamp body and the support stand will be disassembled when in storage after being used or when being moved. Some large ring lamps and support stands are separated from each other for storage, but some are folded for storage. As a result, since the ring lamps are in a round shape but the support stands are in a slender shape, the storage in the folding manner will greatly increase the storage volume.

In addition, the conventional photography lamp body is often provided with a hole or an accessory holder for holding a photography umbrella or other accessories. Alternatively, the photography lamp body is directly integrated with a softbox. The existing storage manner of such a lamp body provided with the hole or integrated with the softbox is to disassemble the lamp body from the support stand. The conveniences of use, storage and movement can be achieved by assembling or disassembling the lamp body and the support stand. However, its disadvantages are that the parts are easy to be lost, the assembling and disassembling are time-consuming, and more importantly, it will cause an inconvenience to the user because the user must know the assembling or disassembling details of each part from the installation specification.

In addition, the existing assembling of the lamp body and the support stand can be achieved by connecting a connection member attached with the lamp body and a connection adapter attached to the support stand. However, such a connection manner uses one more part and thus lacks cost-effectiveness.

SUMMARY OF THE INVENTION

In order to solve the problem of assembling and disassembling the lamp body and the support stand, the present invention provides an integrated lamp stand, in which the user does not need to assemble and disassemble. In addition, the consistency of the collapsed shape is also taken into consideration, that is, the transverse width of the lamp body and the transverse width of the support stand when both are in the collapsed state need to be very close to each other. When in use, the angle of the lamp body is adjusted to a use angle, and the leg tubes of the support stand are expanded. When in storage, the angle of the lamp body is adjusted to a storage angle, and the leg tubes of the support stand are collapsed, such that the support stand and the lamp body are collapsed to a slender shape.

The technical solution to solve its technical problem adopted by the present invention is to provide an integrated lamp stand, including a support stand, a pivot member, and a lamp body.

The support stand has three leg tubes, a center tube assembly, and a sliding connector sleeved on the center tube assembly. The sliding connector is provided with a first fastener, and the center tube assembly and the sliding connector are slidable with each other. The pivot member is coupled on a top of the center tube assembly, and the pivot member and the center tube assembly are non-pivotable with each other.

The lamp body is pivotably connected to the pivot member through a second fastener. A transverse width of the lamp body and a transverse width of the support stand have a preset ratio when both are in a collapsed state. In an expanded state, the leg tubes are expanded, the sliding connector is moved to a predetermined position of the center tube assembly, the first fastener is locked, the center tube assembly is elongated to a predetermined length, and the lamp body is adjusted to a predetermined angle through the second fastener. In a collapsed state, the first fastener is loosen, the leg tubes are collapsed, the sliding connector is moved to another predetermined position of the center tube assembly, the center tube assembly is adjusted to a minimum length, and the lamp body is adjusted to another predetermined angle through the second fastener, whereby the lamp body and the support stand are collapsed to a slender shape.

Preferably, the preset ratio of the transverse width of the lamp body and the transverse width of the support stand when both are in the collapsed state should be less than 2:1.

Preferably, the lamp body is provided with a hole for holding a photography umbrella.

Preferably, the lamp body is provided with a light source.

Preferably, the lamp body is provided with a cloth lampshade, and the lamp body and the cloth lampshade are non-detachable with each other.

Preferably, the cloth lampshade is a rotary softbox including a plurality of support stems and a rotary cloth, wherein one end of each of the plurality of support stems is pivotably connected to the lamp body, and the rotary cloth is arranged on the plurality of support stems and provided with a coupling part at both ends thereof; and wherein when the coupling parts are coupled with each other, the plurality of support stems are radially arranged by the lamp body as a center, and the rotary cloth bulges to form the rotary softbox; when the coupling parts are separated from each other, the plurality of support stems are pivoted toward lateral sides of the lamp body to a position at which the support stems are adjacent to each other, so as to be collapsed to the slender shape, and the rotary softbox is pivoted to a predetermined position by adjusting the angle of the lamp body through the pivot member, so that the support stand and the rotary cloth of the rotary softbox are longitudinally adjacent to each other so as to be collapsed to the slender shape.

Preferably, the cloth lampshade is a push-type softbox including a plurality of long support stems, a plurality of short support stems, a ring, and a tapered cloth, wherein the plurality of long support stems are connected with the tapered cloth and connected to the lamp body at one end thereof, one end of each of the plurality of short support stems is connected to a predetermined position of a corresponding one of the plurality of long support stems, and another end of each of the plurality of short support stems is connected to the ring; and wherein when the push-type softbox is expanded, the ring is pushed toward the lamp body, such that the ring and the lamp body are coupled with each other, whereby the long support stems are radially arranged by the lamp body as a center, and the tapered cloth bulges to form the push-type softbox; when the ring is pulled away from the lamp body, the long support stems, the short support stems and the tapered cloth are collapsed toward a front of the lamp body so as to be collapsed to the slender shape, and the push-type softbox is pivoted to a predetermined position by adjusting the angle of the lamp body through the pivot member, so that the support stand and the tapered cloth of the push-type softbox are longitudinally adjacent to each other so as to be collapsed to the slender shape.

The present invention has the advantages that the lamp body and the support stand are coupled to be an integrated lamp stand which is non-detachable, in which the pivot member is directly coupled on at the top of the support stand, and the transverse width of the support stand and the transverse width of the support body when both are in the collapsed state are very close to each other, thereby maintaining a minimum size when in storage, and avoiding the problems of time-consuming and parts losing when assembling and disassembling.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Hereinafter, the implementation of the present invention will be described according to FIGS. 1 to 8D. This description is not intended to limit the implementation of the present invention, but is one of the embodiments of the present invention.

Figure 1:
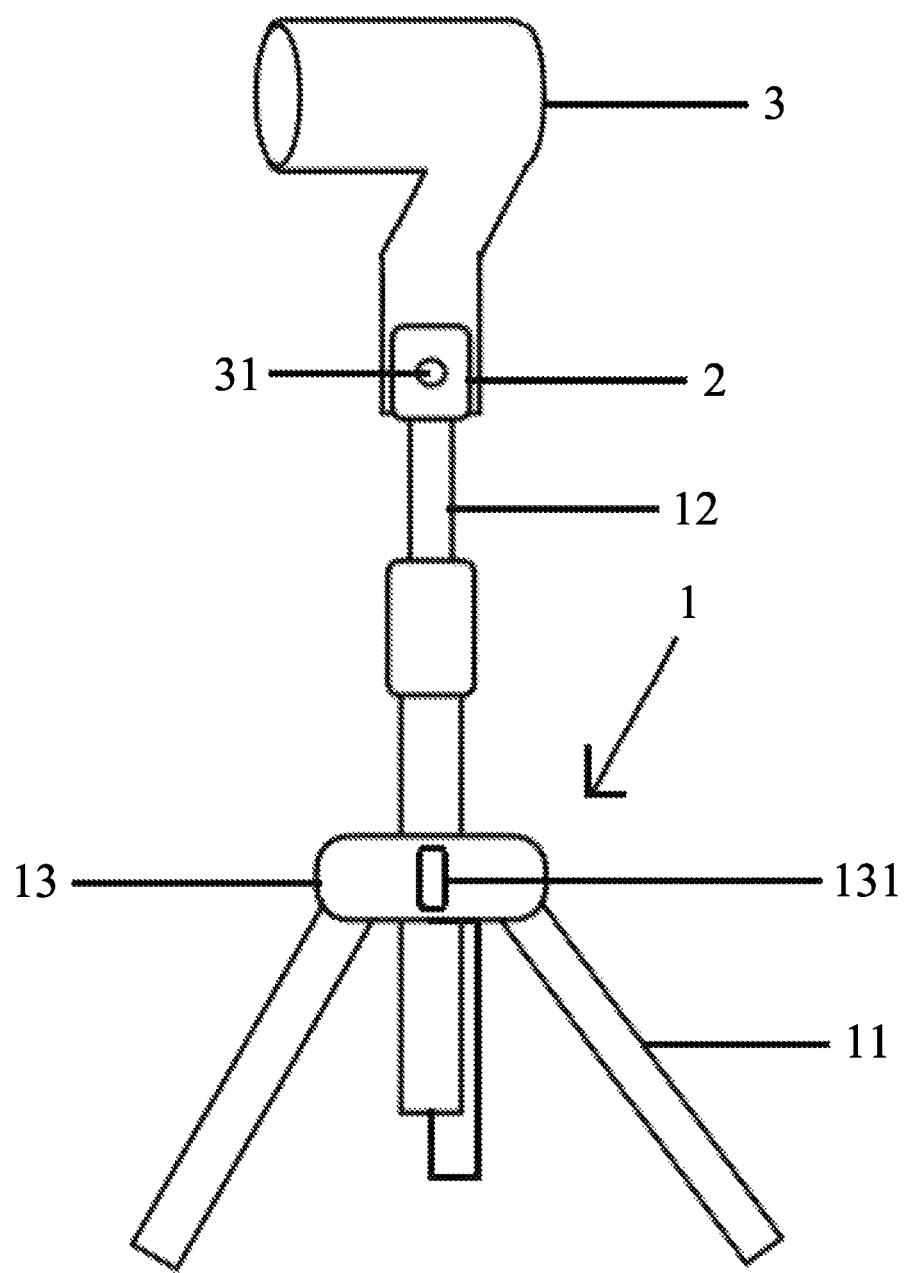
FIG. 1 is a schematic view of an expanded state of a first embodiment of the present invention.
Figure 2:
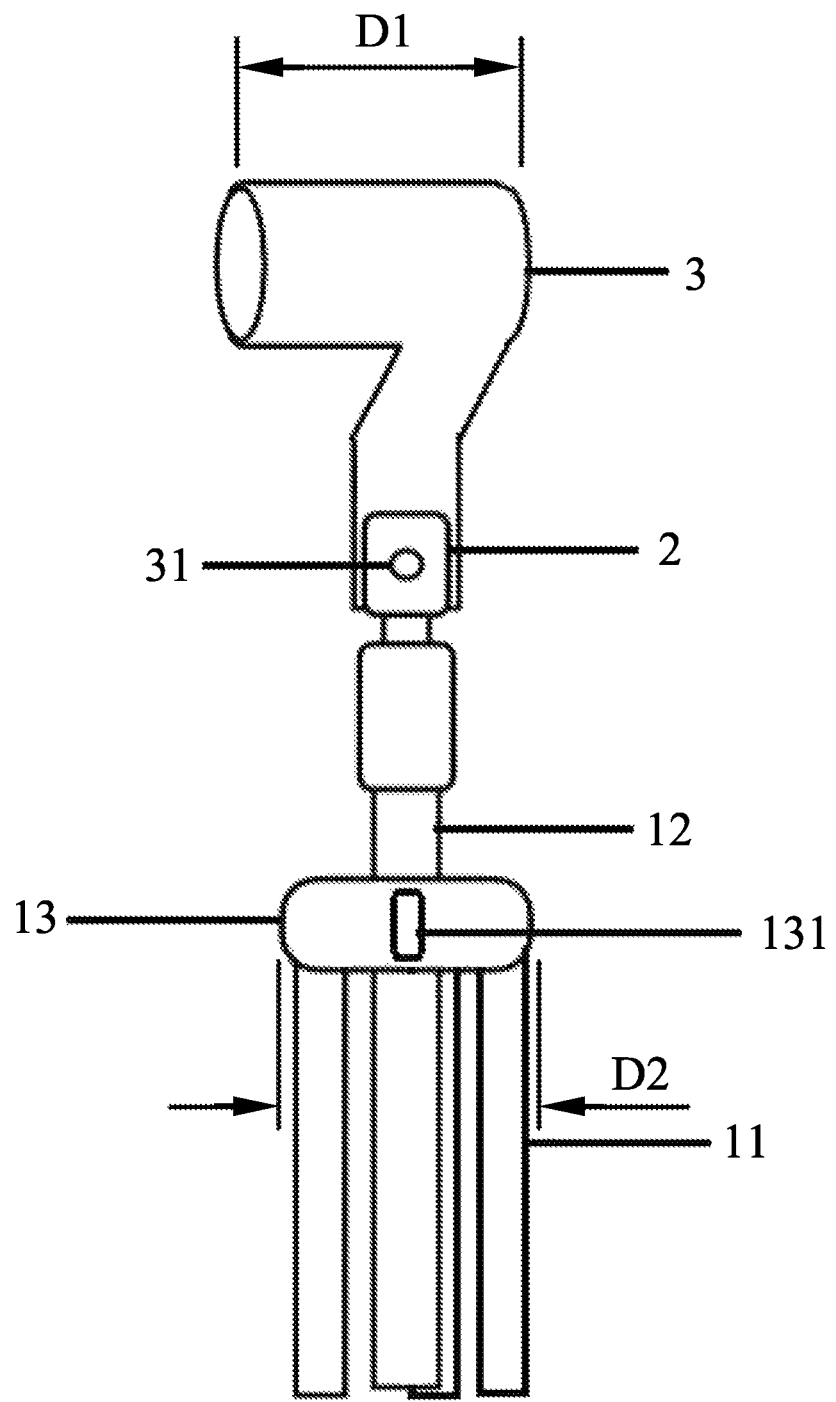
FIG. 2 is a schematic view of a collapsed state of the first embodiment of the present invention.

As shown in FIGS. 1 to 2, an integrated lamp stand according to the first embodiment of the present invention includes: a support stand 1, a pivot member 2, and a lamp body 3. The support stand 1 has three leg tubes 11, a center tube assembly 12, and a sliding connector 13 sleeved on the center tube assembly 12. The sliding connector 13 is provided with a first fastener 131. The center tube assembly 12 and the sliding connector 13 are slidable with each other. The pivot member 2 is coupled on a top of the center tube assembly 12, and the pivot member 2 and the center tube assembly 12 are non-pivotable with each other. The lamp body 3 is pivotably connected to the pivot member 2 through a second fastener 31. A transverse width D1 of the lamp body and a transverse width D2 of the support stand have a preset ratio when both are in a collapsed state. As shown in FIG. 1, in the expanded state, the leg tubes 11 are expanded, the sliding connector 13 is moved to a predetermined position of the center tube assembly 12, the first fastener 131 is locked, the center tube assembly 12 is elongated to a predetermined length, and the lamp body 3 is adjusted to an predetermined angle through the second fastener 31. As shown in FIG. 2, in a collapsed state, the first fastener 131 is loosen, the leg tubes 11 are collapsed, the sliding connector 13 is moved to another predetermined position of the center tube assembly 12, the center tube assembly 12 is adjusted to a minimum length, and the lamp body 3 is adjusted to an predetermined angle through the second fastener 31, whereby the lamp body 3 and the support stand 1 are collapsed to a slender shape. In addition, the center tube assembly may be a telescopic tube.

It is important to note that the position of the sliding connector 13 is variable so that the support stand 1 can be adjusted to a desired height, and the lamp body 3 can also be adjusted and positioned at any desired angle within a range limited by the pivot member 2. As shown in FIG. 2, in the first embodiment of the present invention, the preset ratio of the transverse width D1 of the lamp body and the transverse width D2 of the support stand when both are in the collapsed state should be less than 2:1. In the present invention, when the preset ratio is closer to 1:1, it is more advantageous to the overall storage. Preferably, the preset ratio is 1:1.

Figure 3:
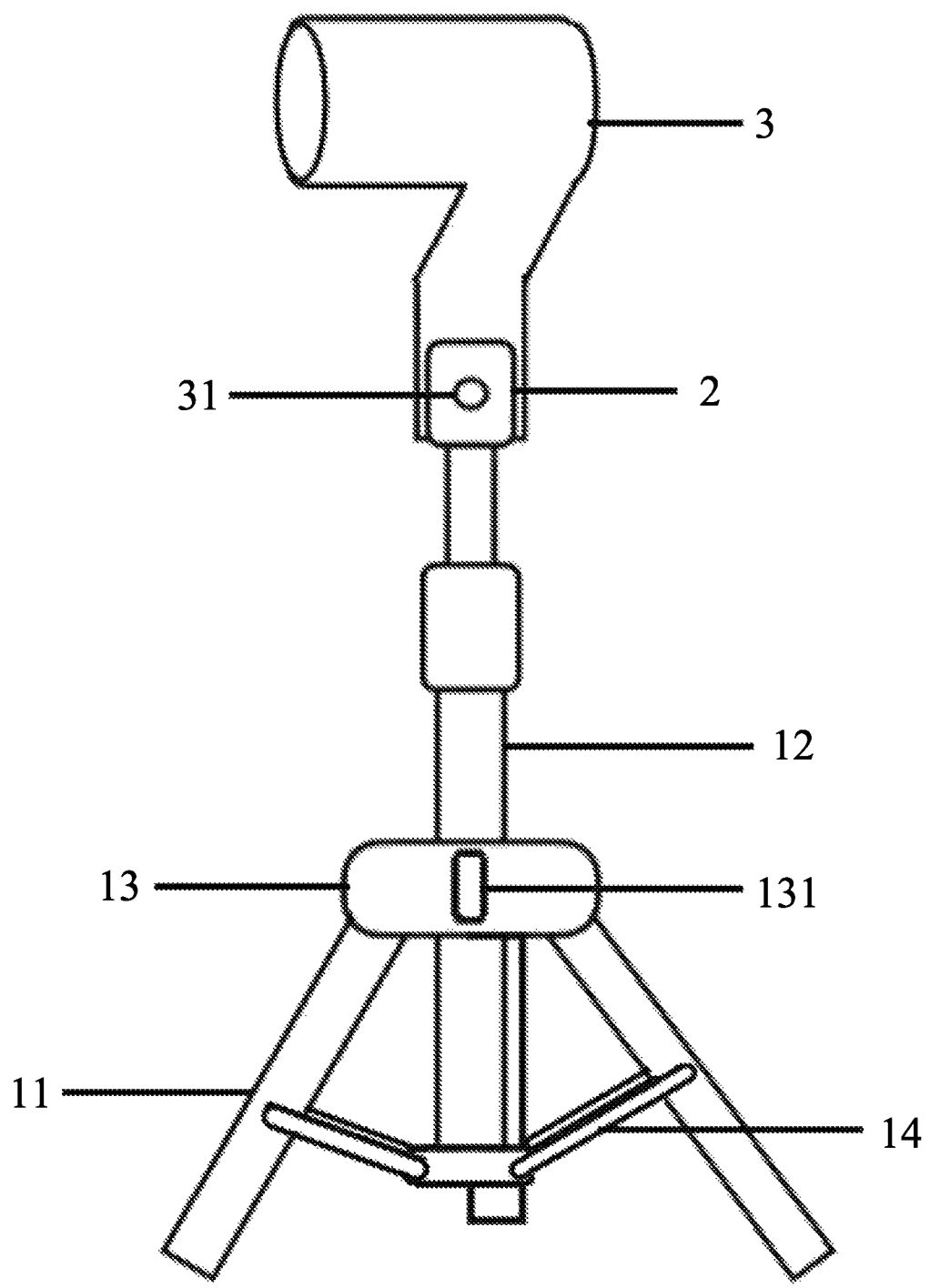
FIG. 3 is a schematic view of an expanded state of a second embodiment of the present invention.

As shown in FIG. 3, in the second embodiment of the present invention, each leg tube 11 may be pivotably connected to the sliding connector 13, and a plurality of first braces 14 are provided to pivotably connect the center tube assembly 12 and each leg tube 11, respectively.

Figure 4:
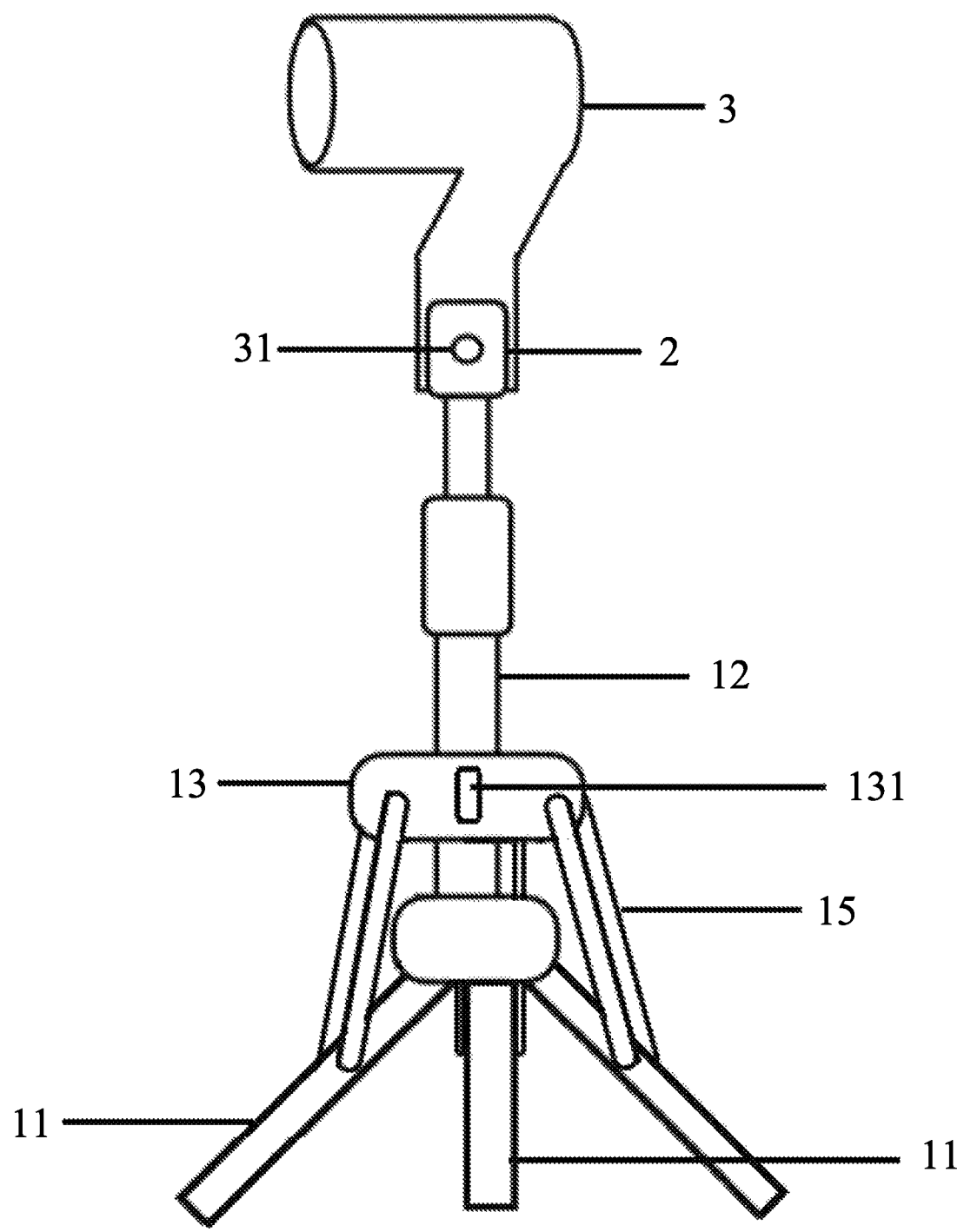
FIG. 4 is a schematic view of an expanded state of a third embodiment of the present invention.

As shown in FIG. 4, in the third embodiment of the present invention, each leg tube 11 is pivotably connected to the center tube assembly 12, and a plurality of second braces 15 are provided to pivotably connect the sliding connector 13 and each leg tube 11, respectively.

Figure 5:
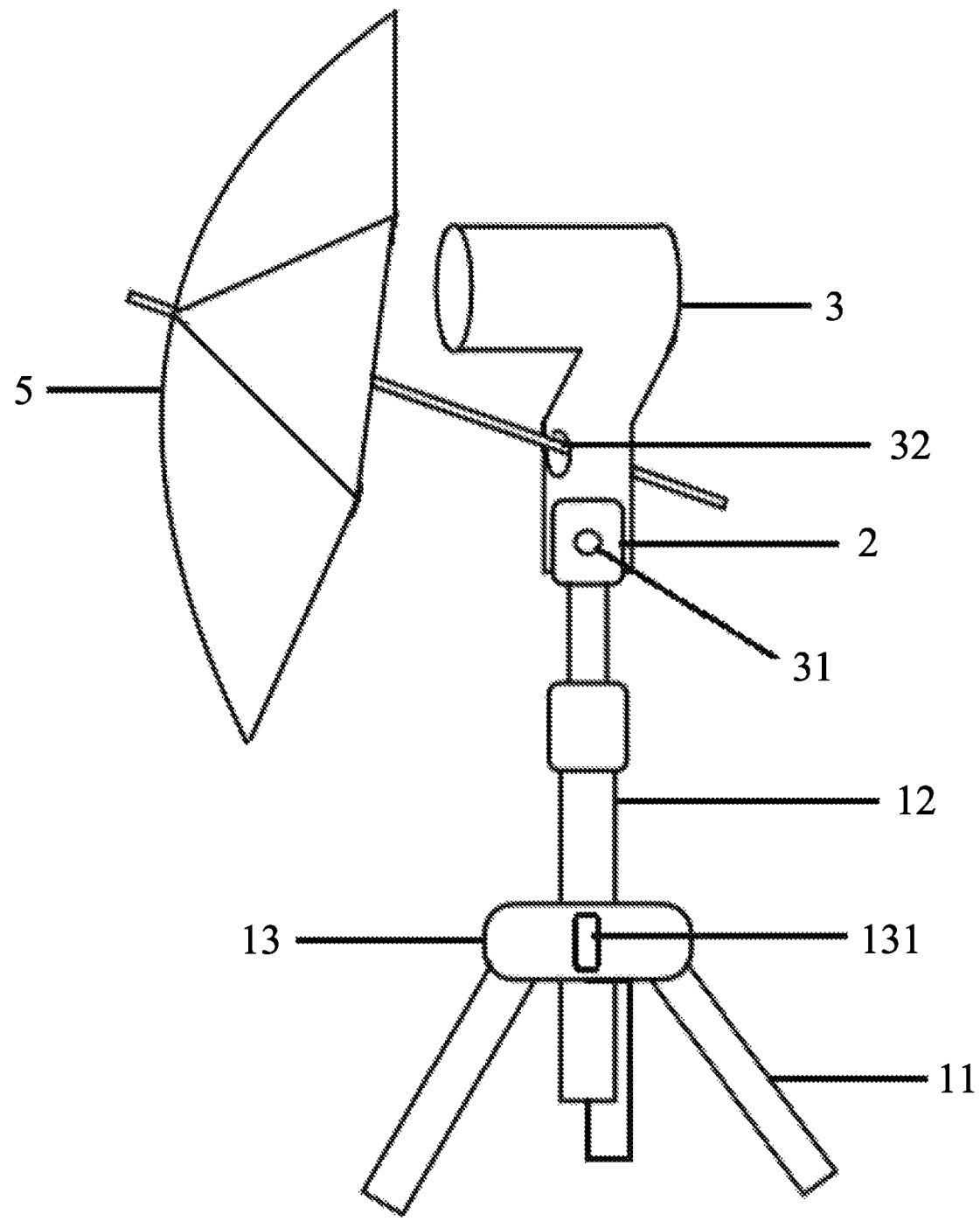
FIG. 5 is a schematic view of an expanded state of a fourth embodiment of the present invention.

As shown in FIG. 5, in the fourth embodiment of the present invention, the lamp body 3 is provided with a hole 32, and the hole 32 may be used to be installed with a photography umbrella 5.

Figure 6:
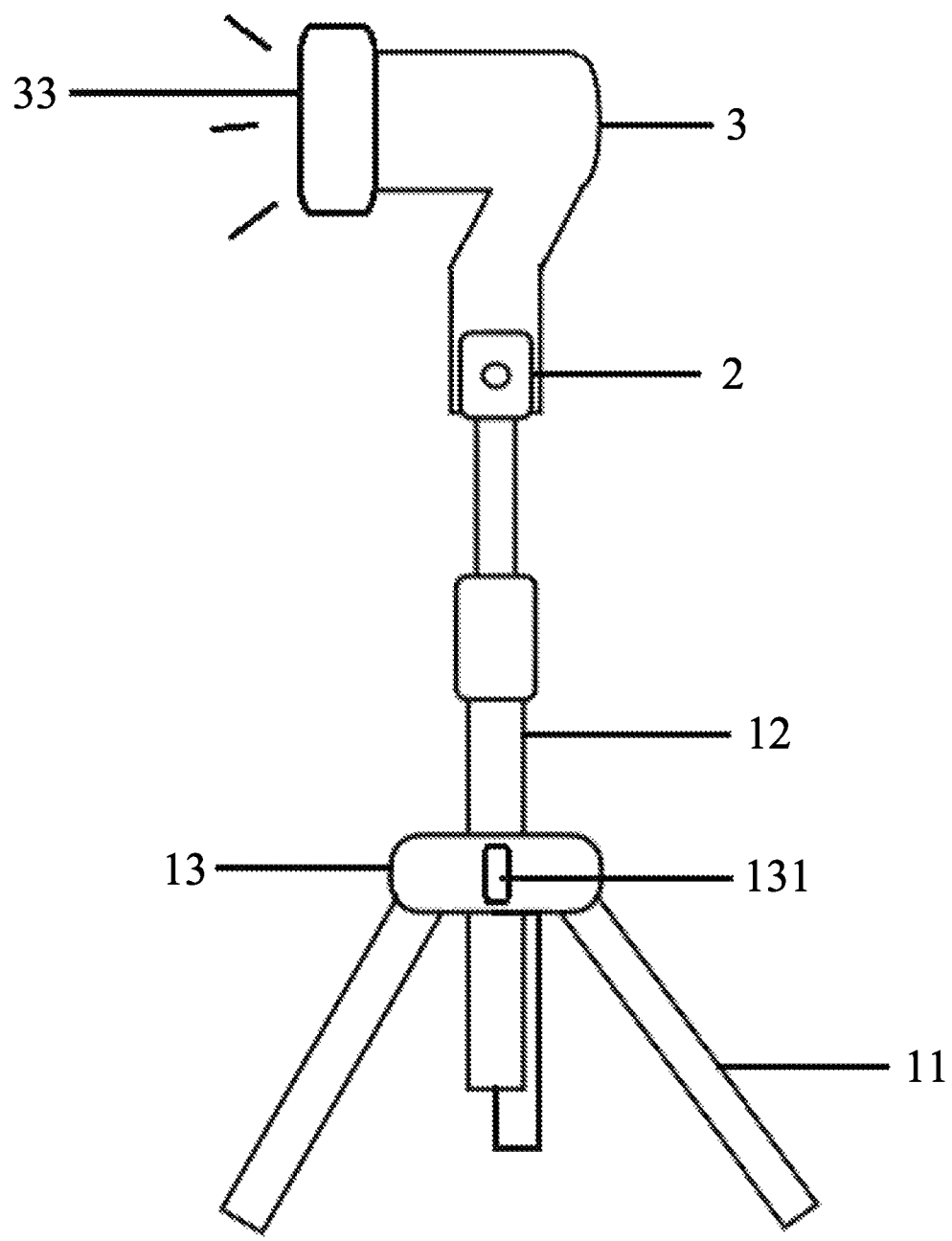
FIG. 6 is a schematic view of an expanded state of a fifth embodiment of the present invention.

As shown in FIG. 6, in the fifth embodiment of the present invention, the lamp body 3 is provided with a light source 33. There is no need to disassemble the light source 33 from the lamp body 3 when in storage.

As shown in FIGS. 7A to 8D, in the sixth and seventh embodiments of the present invention, the lamp body 3 is provided with a cloth lampshade 4. The lamp body 3 and the cloth lampshade 4 are non-detachable with each other, and can be collapsed to a slender shape, so that the support stand can also prevent the cloth lampshade from deformation. The inner side of the cloth lampshade 4 can be made of retro-reflective material.

Figure 7A:
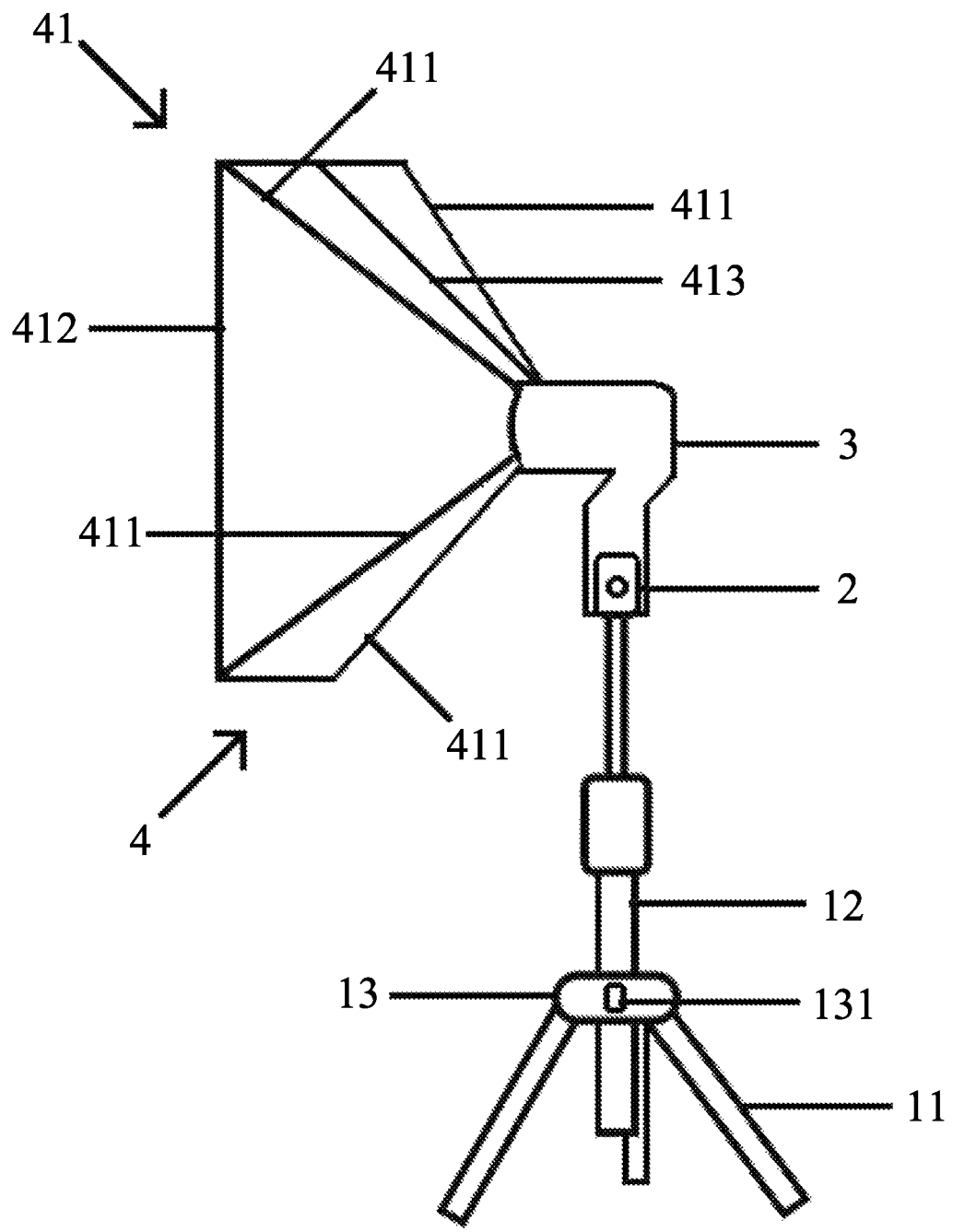
FIG. 7A is a schematic view of an expanded state of a sixth embodiment of the present invention.
Figure 7B:
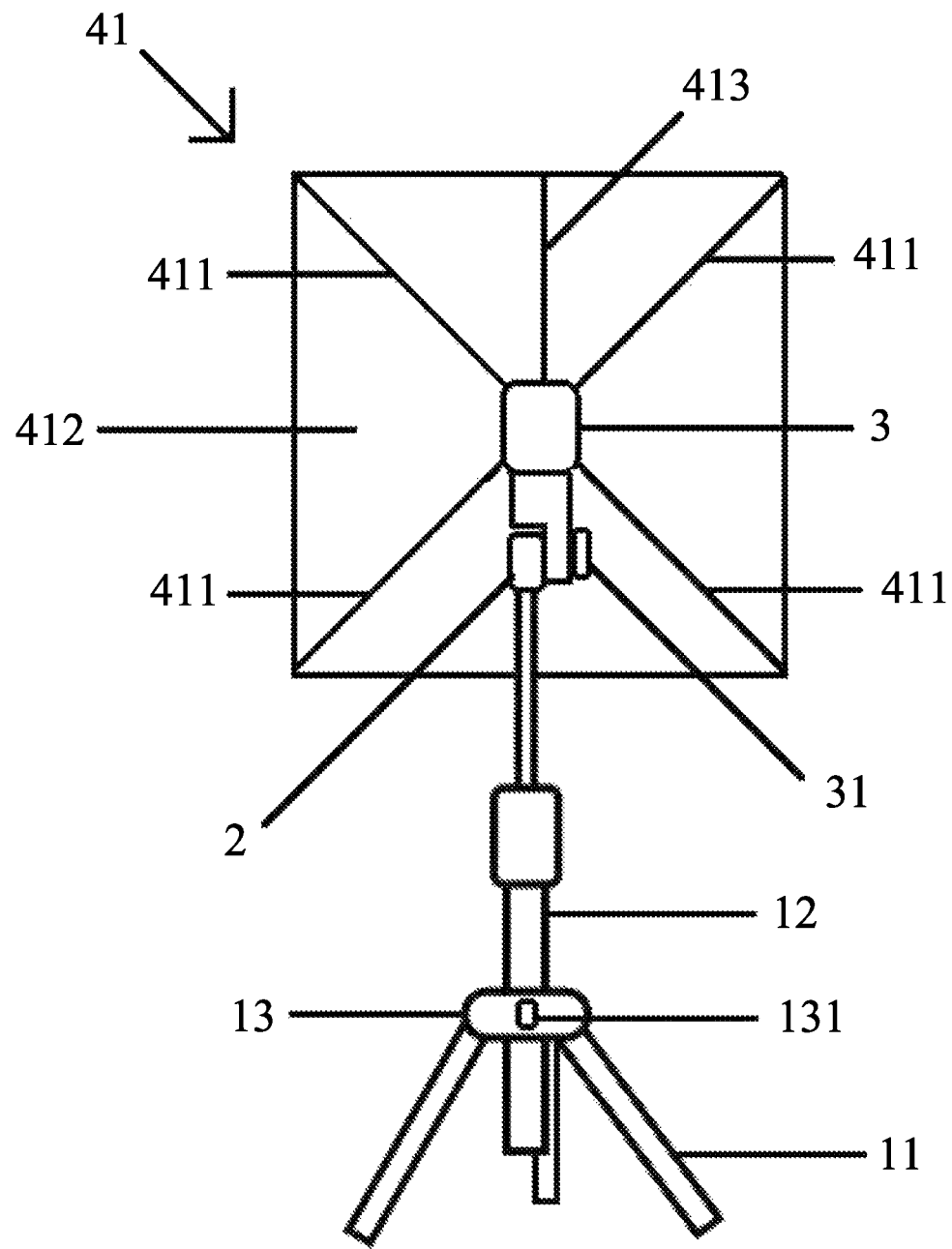
FIG. 7B is a schematic view of the expanded state of the sixth embodiment of the present invention viewed from another direction.
Figure 7C:
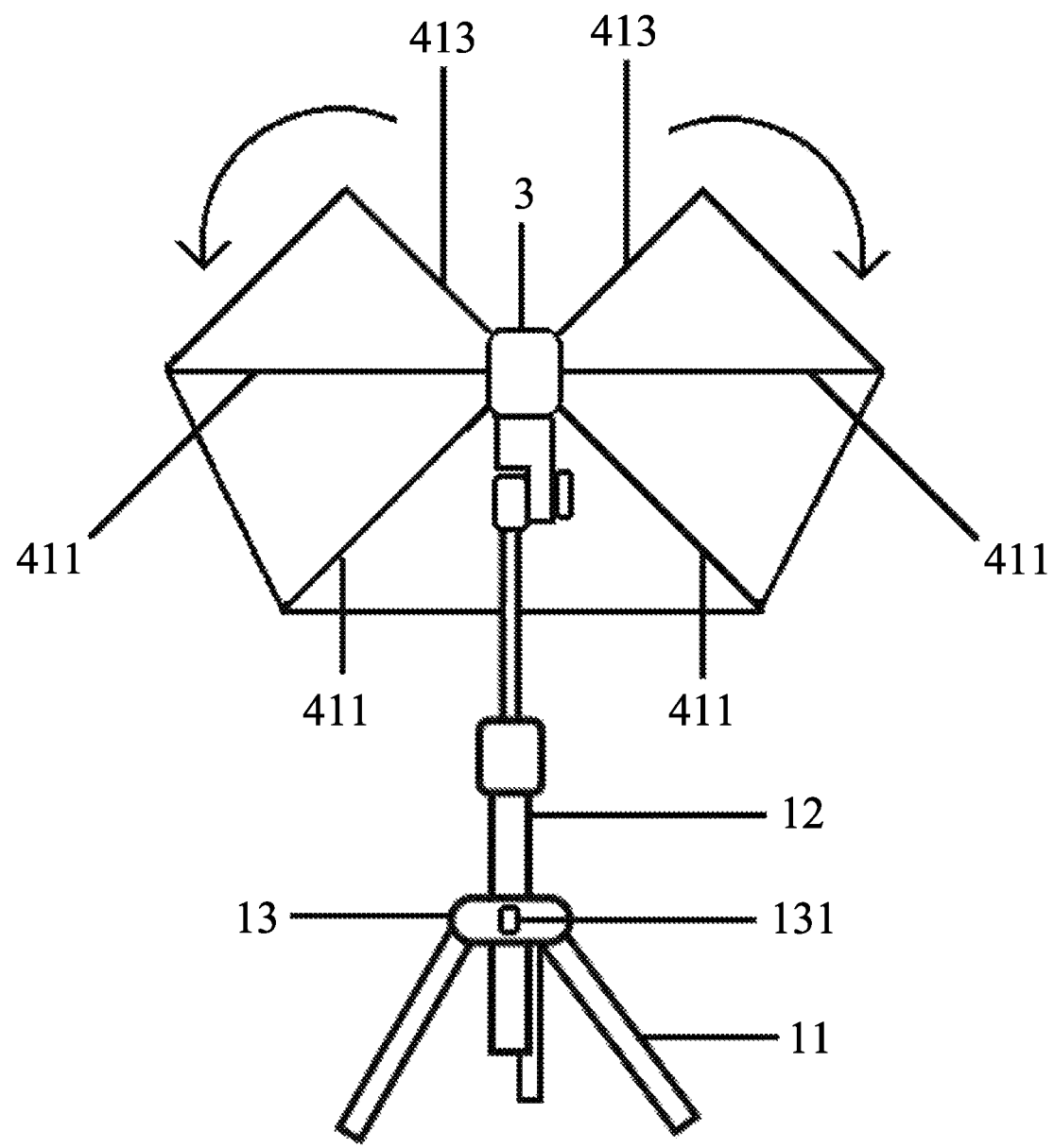
FIG. 7C is a schematic view of the sixth embodiment of the present invention showing a cloth lampshade is being collapsed.
Figure 7D:
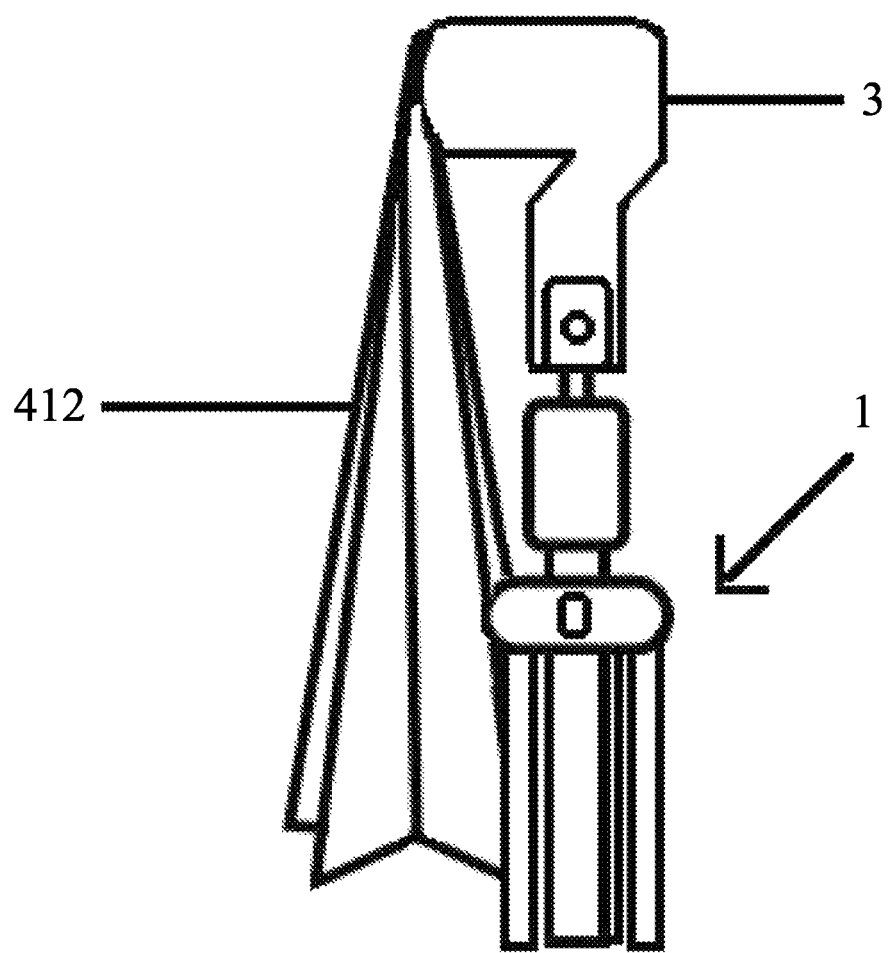
FIG. 7D is a schematic view of a collapsed state of the sixth embodiment of the present invention.

As shown in FIGS. 7A to 7D, the cloth lampshade 4 of the sixth embodiment is a rotary softbox 41. As shown in FIG. 7A, the rotary softbox 41 includes a plurality of support stems 411 and a rotary cloth 412. One end of each of the plurality of support stems 411 is pivotably connected to the lamp body 3. The rotary cloth 412 is arranged on the plurality of support stems 411 and provided with a coupling part 413 at both ends thereof. As shown in FIG. 7B, when the coupling parts 413 are coupled with each other, the plurality of support stems 411 are radially arranged by the lamp body 3 as a center, and the rotary cloth 412 bulges to form the rotary softbox 41. As shown in FIG. 7C, the coupling parts 413 are separated from each other, the plurality of support stems 411 are pivoted toward lateral sides of the lamp body 3 to a position at which the support stems 411 are adjacent to each other, so as to be collapsed to a slender shape. As shown in FIG. 7D, the rotary softbox 41 is pivoted to a predetermined position by adjusting the angle of the lamp body 3 through the pivot member, so that the support stand 1 and the rotary cloth 412 of the rotary softbox 41 are longitudinally adjacent to each other so as to be collapsed to a slender shape.

Figure 8A:
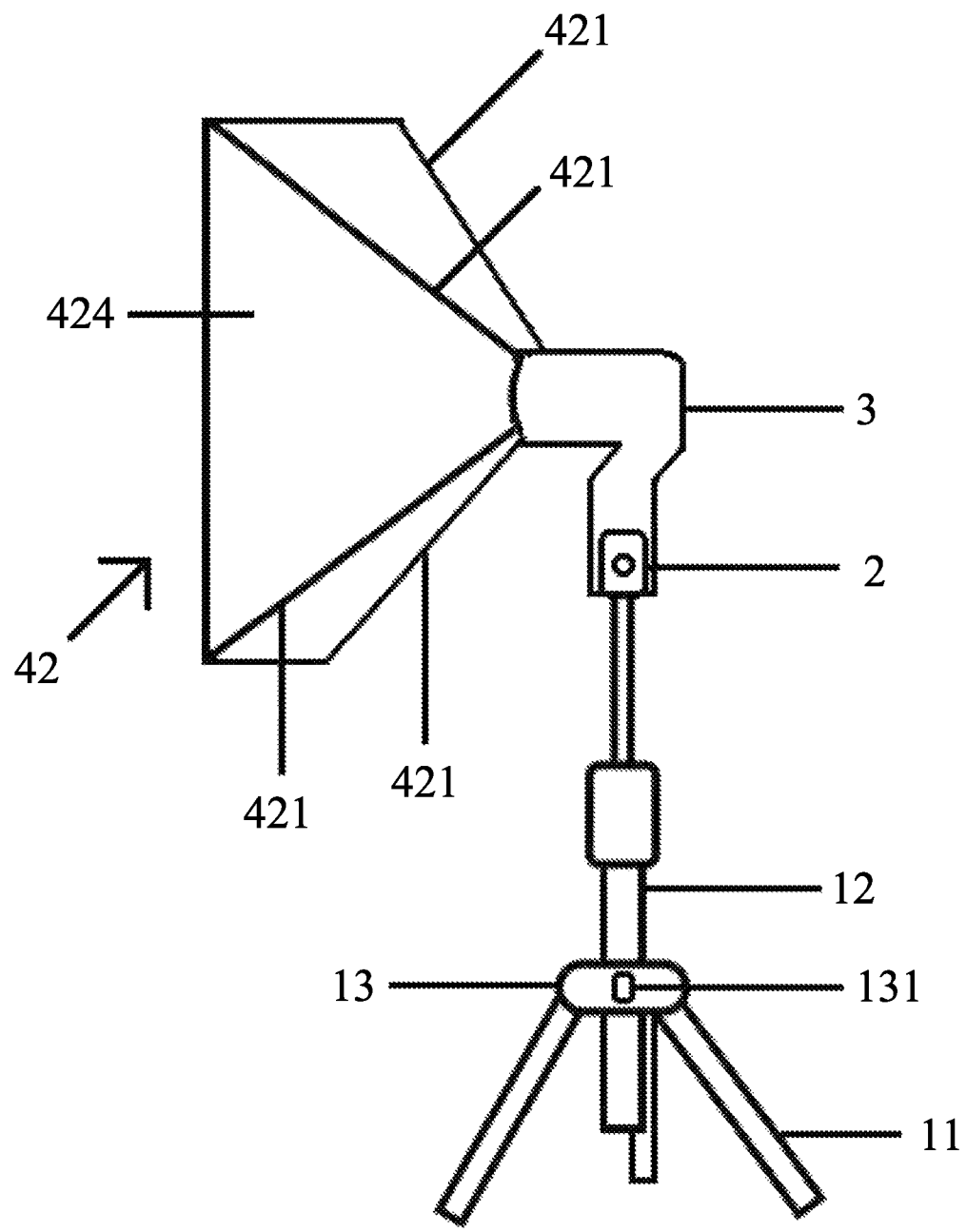
FIG. 8A is a schematic view of an expanded state of a seventh embodiment of the present invention.
Figure 8B:
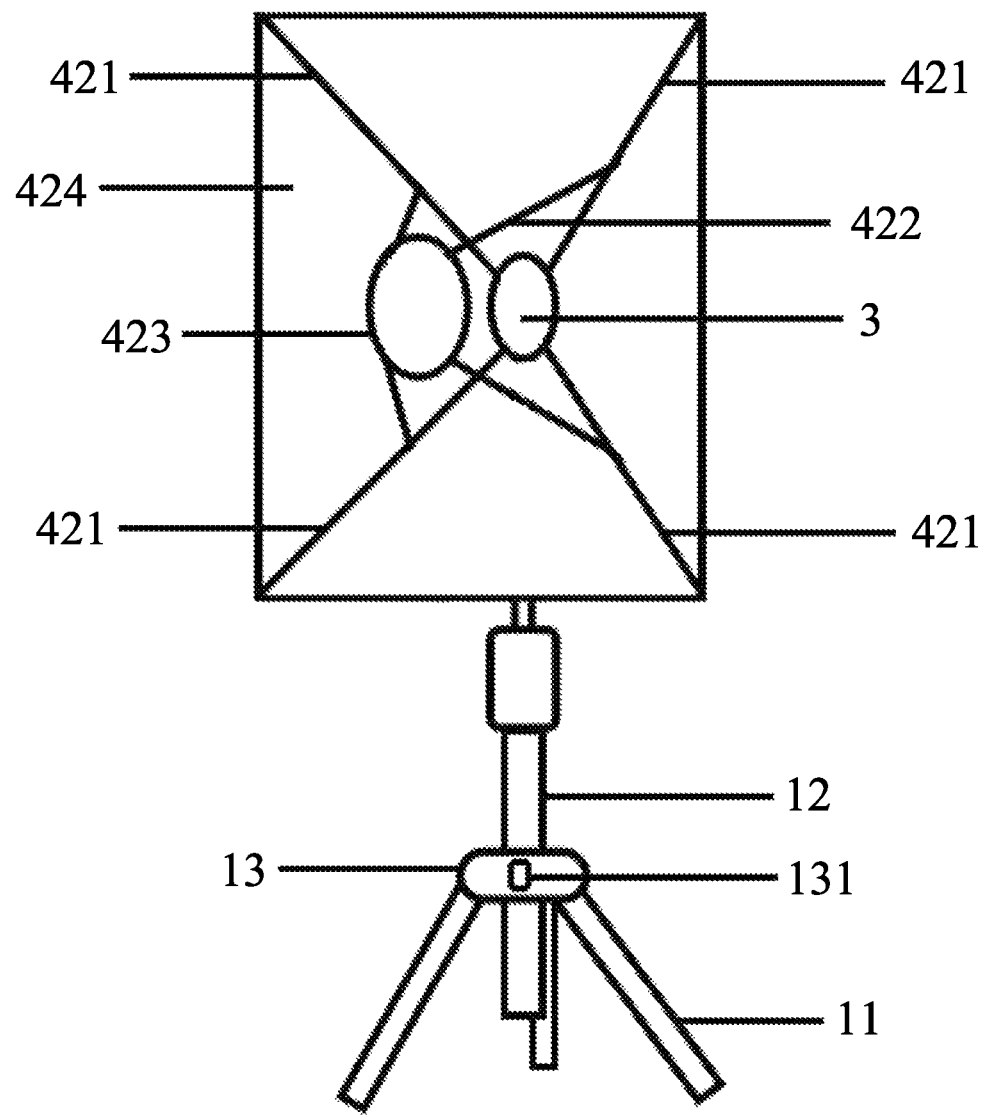
FIG. 8B is a schematic view of the seventh embodiment of the present invention showing a cloth lampshade is being collapsed.
Figure 8C:
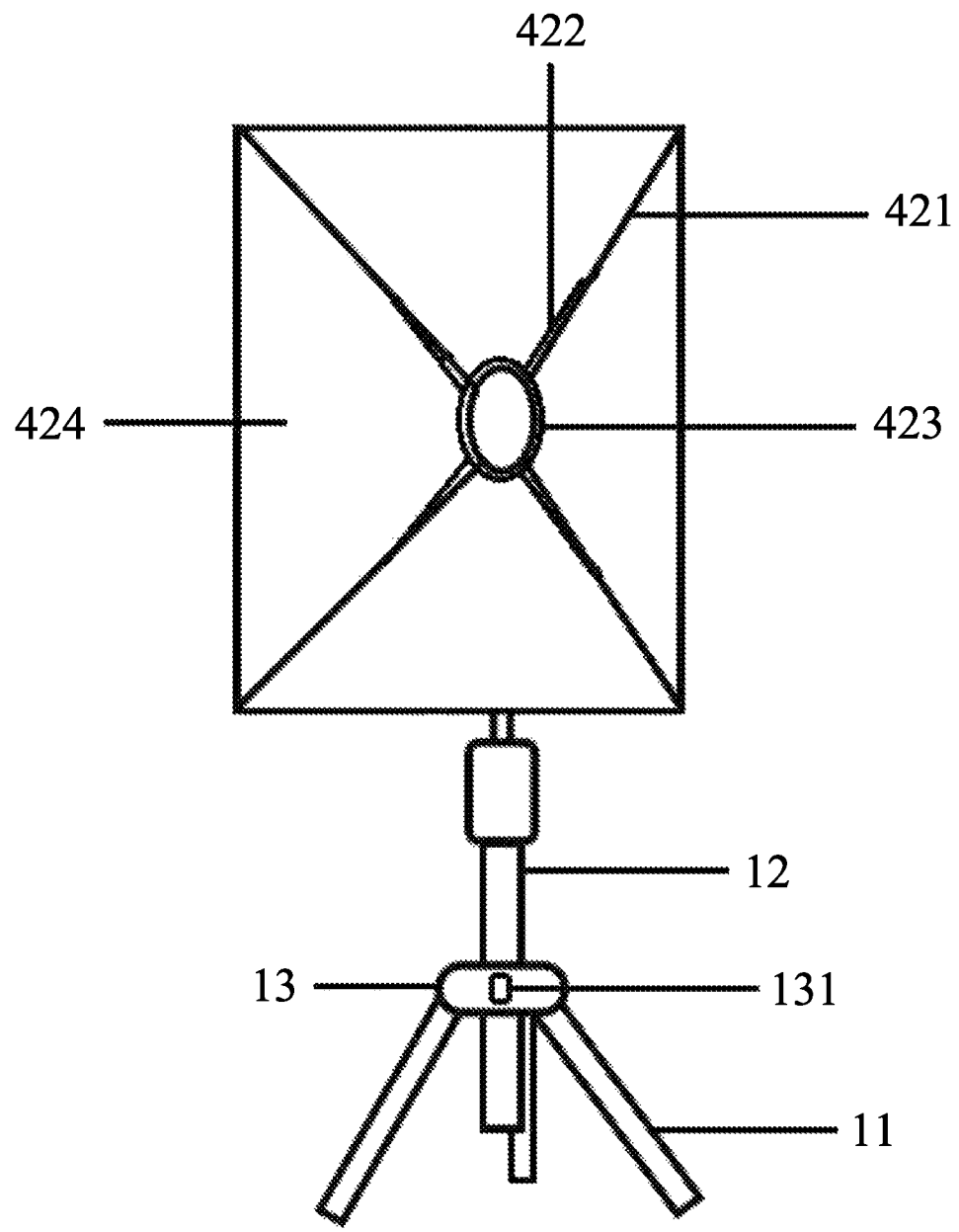
FIG. 8C is a schematic view of the expanded state of the seventh embodiment of the present invention viewed from another direction.
Figure 8D:
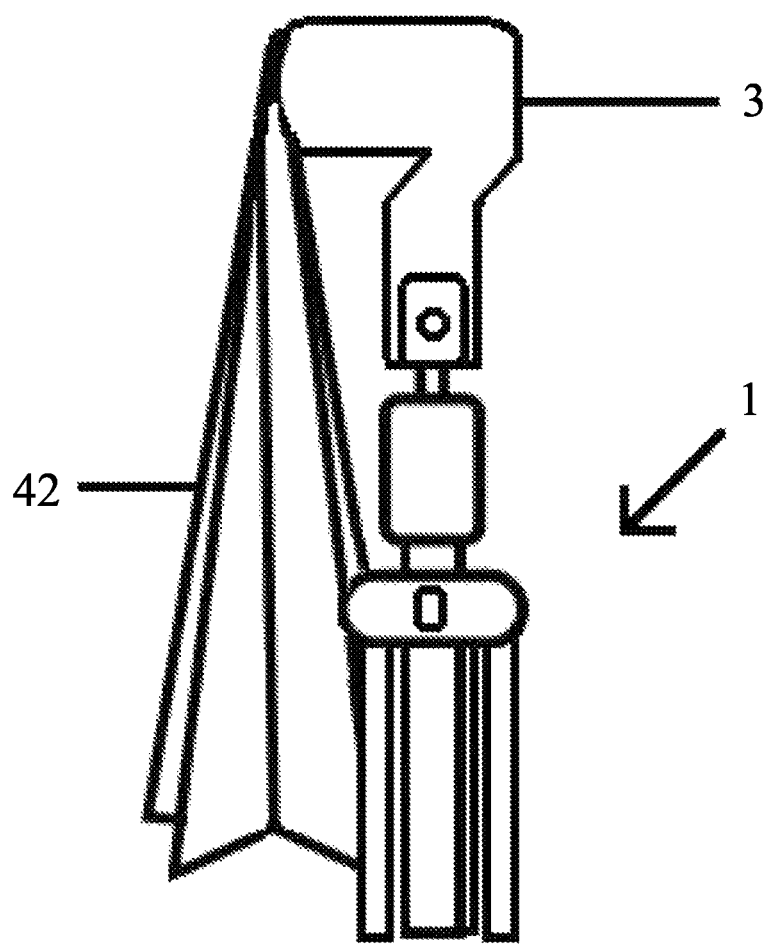
FIG. 8D is a schematic view of a collapsed state of the seventh embodiment of the present invention.

As shown in FIGS. 8A to 8D, the cloth lampshade 4 of the seventh embodiment is a push-type softbox 42. As shown in FIGS. 8A and 8B, the push-type softbox 42 includes a plurality of long support stems 421, a plurality of short support stems 422, a ring 423, and a tapered cloth 424. The plurality of long support stems 421 are connected with the tapered cloth 424 and connected to the lamp body 3 at one end thereof. One end of each of the plurality of short support stems 422 is connected to a predetermined position of a corresponding one of the plurality of long support stems 421, and another end of each of the plurality of short support stems 422 is connected to the ring 423. As shown in FIG. 8C, when the push-type softbox 42 is expanded, the ring 423 is pushed toward the lamp body 3, such that the ring 423 and the lamp body 3 are coupled with each other, whereby the long support stems 421 are radially arranged by the lamp body 3 as a center, and the tapered cloth 424 bulges to form the push-type softbox 42. As shown in FIG. 8B, when the ring 423 is pulled away from the lamp body 3, the long support stems 421, the short support stems 422 and the tapered cloth 424 are collapsed toward a front of the lamp body 3 so as to be collapsed to the slender shape. As shown in FIG. 8D, the push-type softbox 42 is pivoted to a predetermined position by adjusting the angle of the lamp body 3 through the pivot member, so that the support stand 1 and the tapered cloth 424 of the push-type softbox 42 are longitudinally adjacent to each other so as to be collapsed to the slender shape. The tapered cloth can be quadrangular pyramid shape, hexagonal pyramid shape, or other tapered shapes.

The foregoing descriptions and illustrations are merely explanations for better embodiments of the present invention. Those skilled in the art can make other modifications according to the claimed scope of the accompanying claims and the foregoing descriptions, provided that such modifications are still belonged to the inventive spirit of present invention and should fall within the claimed scope of the present invention.

What is claimed is:

1. An integrated lamp stand, comprising:
   a support stand having three leg tubes, a center tube assembly, and a sliding connector sleeved on the center tube assembly, the sliding connector provided with a first fastener, wherein an upper end of each of the three leg tubes is pivotably coupled to the sliding connector so as to move along with the sliding connector, and the center tube assembly and the sliding connector are slidable with each other for positioning the sliding connector to a variable position that can be locked by the first fastener to set the support stand to a desired height;
   a pivot member coupled on a top of the center tube assembly, wherein the pivot member and the center tube assembly are non-pivotable with each other; and
   a lamp body pivotably connected to the pivot member through a second fastener for adjusting and positioning the lamp body at any desired angle within a range limited by the pivot member, wherein a transverse width of the lamp body and a transverse width of the support stand have a preset ratio when both are in a collapsed state,
   wherein, in an expanded state, the leg tubes are expanded, the sliding connector is moved to a predetermined position of the center tube assembly, the first fastener is locked, the center tube assembly is elongated to a predetermined length, and the lamp body is adjusted to a predetermined angle through the second fastener; in a collapsed state, the first fastener is loosen, the leg tubes are collapsed, the sliding connector is moved to another predetermined position of the center tube assembly, the center tube assembly is adjusted to a minimum length, and the lamp body is adjusted to another predetermined angle through the second fastener, whereby the lamp body and the support stand are collapsed to a slender shape.

2. The integrated lamp stand according to claim 1, wherein the preset ratio of the transverse width of the lamp body and the transverse width of the support stand when both are in the collapsed state is less than 2:1.

3. The integrated lamp stand according to claim 1, wherein the lamp body is provided with a hole for holding a photography umbrella.

4. The integrated lamp stand according to claim 1, wherein the lamp body is provided with a light source.

5. The integrated lamp stand according to claim 1, wherein the lamp body is provided with a cloth lampshade, and the lamp body and the cloth lampshade are non-detachable with each other.

6. The integrated lamp stand according to claim 5, wherein the cloth lampshade is a rotary softbox including a plurality of support stems and a rotary cloth, wherein one end of each of the plurality of support stems is pivotably connected to the lamp body, and the rotary cloth is arranged on the plurality of support stems and provided with a coupling part at both ends thereof; and wherein when the coupling parts are coupled with each other, the plurality of support stems are radially arranged by the lamp body as a center, and the rotary cloth bulges to form the rotary softbox; when the coupling parts are separated from each other, the plurality of support stems are pivoted toward lateral sides of the lamp body to a position at which the support stems are adjacent to each other, so as to be collapsed to the slender shape, and the rotary softbox is pivoted to a predetermined position by adjusting the angle of the lamp body through the pivot member, so that the support stand and the rotary cloth of the rotary softbox are longitudinally adjacent to each other so as to be collapsed to the slender shape.

7. The integrated lamp stand according to claim 5, wherein the cloth lampshade is a push-type softbox including a plurality of long support stems, a plurality of short support stems, a ring, and a tapered cloth, wherein the plurality of long support stems are connected with the tapered cloth and connected to the lamp body at one end thereof, one end of each of the plurality of short support stems is connected to a predetermined position of a corresponding one of the plurality of long support stems, and another end of each of the plurality of short support stems is connected to the ring; and wherein when the push-type softbox is expanded, the ring is pushed toward the lamp body, such that the ring and the lamp body are coupled with each other, whereby the long support stems are radially arranged by the lamp body as a center, and the tapered cloth bulges to form the push-type softbox; when the ring is pulled away from the lamp body, the long support stems, the short support stems and the tapered cloth are collapsed toward a front of the lamp body so as to be collapsed to the slender shape, and the push-type softbox is pivoted to a predetermined position by adjusting the angle of the lamp body through the pivot member, so that the support stand and the tapered cloth of the push-type softbox are longitudinally adjacent to each other so as to be collapsed to the slender shape.

8. An integrated lamp stand, comprising:
a support stand having three leg tubes, a center tube assembly, and a sliding connector sleeved on the center tube assembly, the sliding connector provided with a first fastener, wherein the center tube assembly and the sliding connector are slidable with each other;
a pivot member coupled on a top of the center tube assembly, wherein the pivot member and the center tube assembly are non-pivotable with each other; and
a lamp body pivotably connected to the pivot member through a second fastener, wherein a transverse width of the lamp body and a transverse width of the support stand have a preset ratio when both are in a collapsed state,
wherein, in an expanded state, the leg tubes are expanded, the sliding connector is moved to a predetermined position of the center tube assembly, the first fastener is locked, the center tube assembly is elongated to a predetermined length, and the lamp body is adjusted to a predetermined angle through the second fastener; in a collapsed state, the first fastener is loosen, the leg tubes are collapsed, the sliding connector is moved to another predetermined position of the center tube assembly, the center tube assembly is adjusted to a minimum length, and the lamp body is adjusted to another predetermined angle through the second fastener, whereby the lamp body and the support stand are collapsed to a slender shape; and
wherein the lamp body is provided with a cloth lampshade, the lamp body and the cloth lampshade are non-detachable with each other, the cloth lampshade is a rotary softbox including a plurality of support stems and a rotary cloth, one end of each of the plurality of support stems is pivotably connected to the lamp body, and the rotary cloth is arranged on the plurality of support stems and provided with a coupling part at both ends thereof; when the coupling parts are coupled with each other, the plurality of support stems are radially arranged by the lamp body as a center, and the rotary cloth bulges to form the rotary softbox; when the coupling parts are separated from each other, the plurality of support stems are pivoted toward lateral sides of the lamp body to a position at which the support stems are adjacent to each other, so as to be collapsed to the slender shape, and the rotary softbox is pivoted to a predetermined position by adjusting the angle of the lamp body through the pivot member, so that the support stand and the rotary cloth of the rotary softbox are longitudinally adjacent to each other so as to be collapsed to the slender shape.

9. An integrated lamp stand, comprising:
a support stand having three leg tubes, a center tube assembly, and a sliding connector sleeved on the center tube assembly, the sliding connector provided with a first fastener, wherein the center tube assembly and the sliding connector are slidable with each other;
a pivot member coupled on a top of the center tube assembly, wherein the pivot member and the center tube assembly are non-pivotable with each other; and
a lamp body pivotably connected to the pivot member through a second fastener, wherein a transverse width of the lamp body and a transverse width of the support stand have a preset ratio when both are in a collapsed state,
wherein, in an expanded state, the leg tubes are expanded, the sliding connector is moved to a predetermined position of the center tube assembly, the first fastener is locked, the center tube assembly is elongated to a predetermined length, and the lamp body is adjusted to a predetermined angle through the second fastener; in a collapsed state, the first fastener is loosen, the leg tubes are collapsed, the sliding connector is moved to another predetermined position of the center tube assembly, the center tube assembly is adjusted to a minimum length, and the lamp body is adjusted to another predetermined angle through the second fastener, whereby the lamp body and the support stand are collapsed to a slender shape; and
wherein the lamp body is provided with a cloth lampshade, the lamp body and the cloth lampshade are non-detachable with each other, the cloth lampshade is a push-type softbox including a plurality of long support stems, a plurality of short support stems, a ring, and a tapered cloth, the plurality of long support stems are connected with the tapered cloth and connected to the lamp body at one end thereof, one end of each of the plurality of short support stems is connected to a predetermined position of a corresponding one of the plurality of long support stems, and another end of each of the plurality of short support stems is connected to the ring; when the push-type softbox is expanded, the ring is pushed toward the lamp body, such that the ring and the lamp body are coupled with each other, whereby the long support stems are radially arranged by the lamp body as a center, and the tapered cloth bulges to form the push-type softbox; when the ring is pulled away from the lamp body, the long support stems, the short support stems and the tapered cloth are collapsed toward a front of the lamp body so as to be collapsed to the slender shape, and the push-type softbox is pivoted to a predetermined position by adjusting the angle of the lamp body through the pivot member, so that the support stand and the tapered cloth of the push-type softbox are longitudinally adjacent to each other so as to be collapsed to the slender shape.

* * * * *